(12) United States Patent
Alber et al.

(10) Patent No.: US 10,538,322 B2
(45) Date of Patent: Jan. 21, 2020

(54) DELTA FUSELAGE FOR VERTICAL TAKE-OFF AND LANDING (VTOL) AIRCRAFT

(71) Applicant: Sikorsky Aircraft Corporation, Stratford, CT (US)

(72) Inventors: Mark R. Alber, Milford, CT (US); Charles Gayagoy, Orange, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 260 days.

(21) Appl. No.: 15/533,505

(22) PCT Filed: Oct. 16, 2015

(86) PCT No.: PCT/US2015/056002
§ 371 (c)(1),
(2) Date: Jun. 6, 2017

(87) PCT Pub. No.: WO2016/109003
PCT Pub. Date: Jul. 7, 2016

(65) Prior Publication Data
US 2017/0334557 A1    Nov. 23, 2017

Related U.S. Application Data

(60) Provisional application No. 62/094,581, filed on Dec. 19, 2014.

(51) Int. Cl.
*B64C 29/02*    (2006.01)
*B64C 1/00*    (2006.01)
(Continued)

(52) U.S. Cl.
CPC ............ *B64C 29/02* (2013.01); *B64C 1/0009* (2013.01); *B64C 7/02* (2013.01); *B64C 23/069* (2017.05)

(58) Field of Classification Search
CPC ..... B64C 29/02; B64C 23/069; B64C 1/0009; B64C 7/02; Y02T 50/12
See application file for complete search history.

(56) References Cited

U.S. PATENT DOCUMENTS 2,609,167 A    9/1952 Gero, Jr.
2,619,302 A *  11/1952 Loedding ................ B64C 39/10
                                                244/15

(Continued)

FOREIGN PATENT DOCUMENTS

DE    19810687 A1    9/1999
EP    0356601 A1    3/1990

OTHER PUBLICATIONS

ISR Notification of Transmittal of The International Search Report PCT; International Application No. PCT/US15/56002; International Filing Date: Oct. 16, 2015; dated Aug. 5, 2016; pp. 1-9.

(Continued)

*Primary Examiner* — Rodney A Bonnette
(74) *Attorney, Agent, or Firm* — Cantor Colburn LLP

(57) ABSTRACT

A vertical take-off and landing (VTOL) aircraft is provided. The aircraft includes a wing, nacelles supportively disposed at opposite ends of the wing, proprotors respectively attached to each of the nacelles with each of the proprotors being rotatable to generate lift in vertical flight and thrust in horizontal flight and a delta-wing shaped fuselage disposed along the wing between the nacelles.

15 Claims, 4 Drawing Sheets

(51) Int. Cl.
*B64C 23/06* (2006.01)
*B64C 7/02* (2006.01)

(56) References Cited

U.S. PATENT DOCUMENTS

| | | | |
|---|---|---|---|
| 2,967,034 A | 1/1961 | Eyre | |
| 3,653,611 A | 4/1972 | Trupp et al. | |
| 3,761,041 A | 9/1973 | Putman | |
| 3,788,578 A | 1/1974 | Sweeney et al. | |
| 3,912,204 A * | 10/1975 | Wheat | A63H 27/08 244/154 |
| 4,896,160 A | 1/1990 | Miller, Jr. | |
| 5,082,204 A | 1/1992 | Croston | |
| 5,765,783 A | 6/1998 | Albion | |
| 6,129,308 A | 10/2000 | Nastasi et al. | |
| 6,138,957 A | 10/2000 | Nastasi et al. | |
| 6,170,778 B1 | 1/2001 | Cycon et al. | |
| 6,883,750 B2 | 4/2005 | Gmirya | |
| 6,886,776 B2 | 5/2005 | Wagner et al. | |
| 6,948,682 B1 | 9/2005 | Stephenson et al. | |
| 7,093,789 B2 | 8/2006 | Barocela et al. | |
| 7,108,230 B2 | 9/2006 | Clark | |
| 7,611,095 B1 | 11/2009 | Alban, III et al. | |
| 7,854,409 B2 | 12/2010 | Dizdarevic et al. | |
| 8,205,824 B2 | 6/2012 | Goos | |
| 8,434,710 B2 | 5/2013 | Hothi et al. | |
| 8,876,057 B2 | 11/2014 | Alber et al. | |
| 10,077,108 B2 * | 9/2018 | Lauder | B64C 29/02 |
| 2011/0248123 A1 | 10/2011 | Abershitz | |
| 2013/0233973 A1 * | 9/2013 | Nordman | B64C 1/26 244/131 |

OTHER PUBLICATIONS

ISR Written Opinion; International Application No. PCT/US15/56002; International Filing Date: Oct. 16, 2015; dated Aug. 5, 2016; pp. 1-6.

* cited by examiner

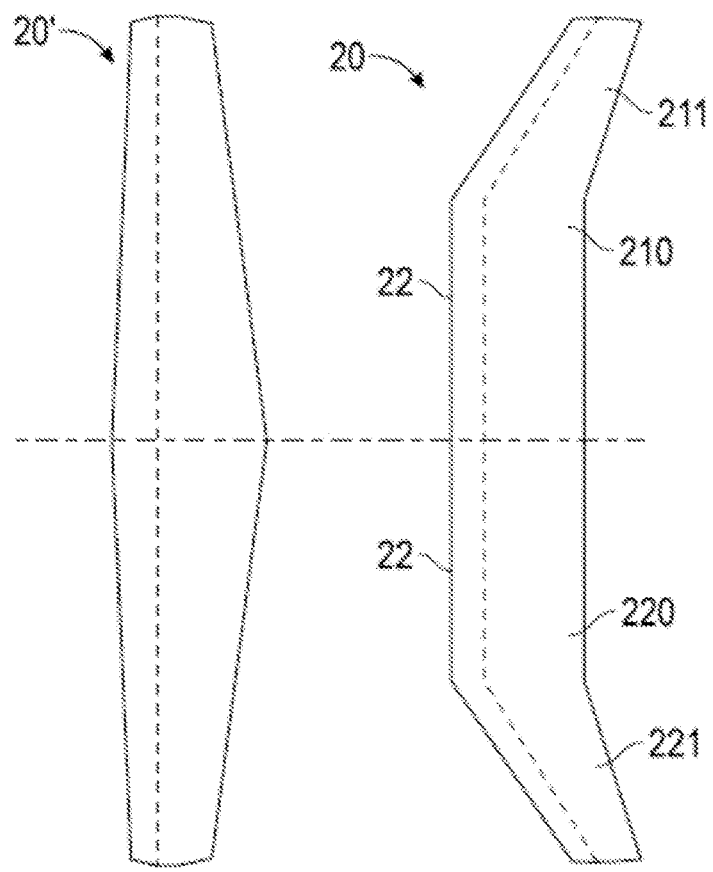
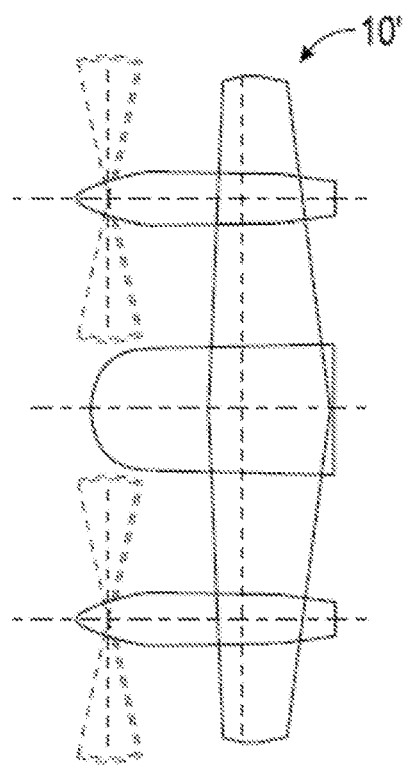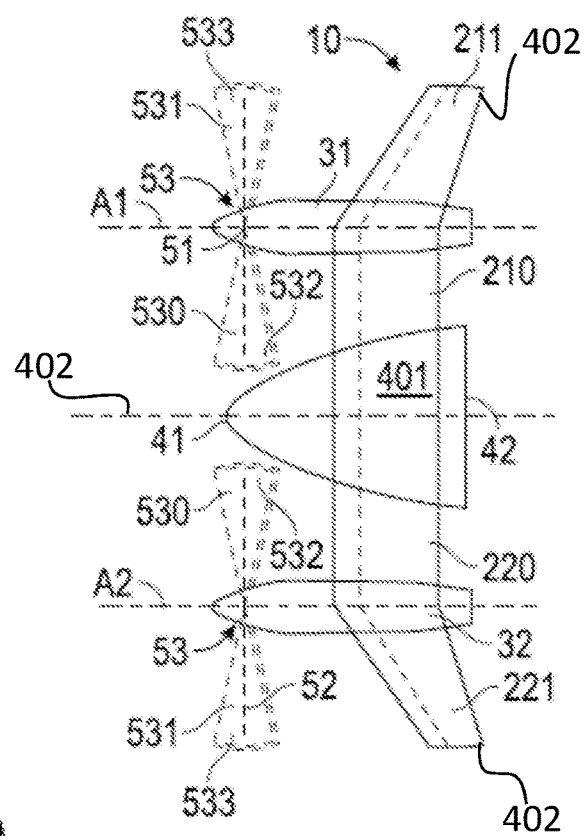
FIG. 8
FIG. 9

DELTA FUSELAGE FOR VERTICAL TAKE-OFF AND LANDING (VTOL) AIRCRAFT

CROSS REFERENCE TO RELATED APPLICATIONS

This application is a National Stage application of PCT/US2015/056002, filed Oct. 16, 2015, which claims the benefit of U.S. Provisional Application No. 62/094,581, filed Dec. 19, 2014, both of which are incorporated by reference in their entirety herein.

FEDERAL RESEARCH STATEMENT

This invention was made with government support under DARPA CONTRACT NO HR0011-14-C-0010 awarded by DARPA. The government has certain rights in this invention.

BACKGROUND OF THE INVENTION

The subject matter disclosed herein relates to vertical take-off and landing (VTOL) aircraft and, more particularly, to a VTOL aircraft with a delta-wing shaped fuselage and swept back wings.

A vertical take-off and landing (VTOL) aircraft is one that can fly horizontally and one that can hover, take off, and land vertically. This classification includes fixed-wing aircraft as well as helicopters and other aircraft with powered rotors, such as cyclogyros/cyclocopters and tiltrotors. Some VTOL aircraft can operate in other modes as well, such as conventional take-off and landing (CTOL), short take-off and landing (STOL) and short take-off and vertical landing STOVL). Others, such as some helicopters, can only operate by VTOL, due to the aircraft lacking landing gear that can handle horizontal motion.

An ongoing issue with VTOL aircraft is that they can be well suited for vertical flight operations but less well suited for horizontal flight or well suited for horizontal flight but unstable during vertical flight operations. That is, the design of VTOL aircraft generally represent a tradeoff between achieving certain design considerations for vertical flight while sacrificing some for horizontal flight and vice versa.

BRIEF DESCRIPTION OF THE INVENTION

According to one aspect of the invention, a vertical take-off and landing (VTOL) aircraft is provided. The aircraft includes a wing, nacelles supportively disposed at opposite ends of the wing, proprotors respectively attached to each of the nacelles with each of the proprotors being rotatable to generate lift in vertical flight and thrust in horizontal flight and a delta-wing shaped fuselage disposed along the wing between the nacelles.

According to additional or alternative embodiments, the fuselage widens in a plan-wise dimension toward a trailing edge thereof and flattens in cross-section toward the trailing edge.

According to additional or alternative embodiments, the fuselage includes a rounded nose portion.

According to additional or alternative embodiments, the fuselage has a center of lift point at about a 25-35% root chord location.

According to additional or alternative embodiments, the wing includes a first wing portion extending outwardly from the fuselage in a first direction, a first winglet extending outwardly from a distal tip of the first wing portion, a second wing portion extending outwardly from the fuselage in a second direction opposite the first direction and a second winglet extending outwardly from a distal tip of the second wing portion.

According to additional or alternative embodiments, the nacelles are respectively disposed at the respective distal tips of the first and second wing portions.

According to additional or alternative embodiments, the first and second winglets are swept back.

According to additional or alternative embodiments, the first and second winglets are swept back at about a 30 degree angle.

According to additional or alternative embodiments, each of the proprotors defines a pivotable rotor disk.

According to additional or alternative embodiments, each of the proprotors defines a rotor disk having an interior edge that is closer to a centerline of the fuselage than a corresponding trailing edge corner of the fuselage.

According to additional or alternative embodiments, each of the proprotors defines a rotor disk having an exterior edge that is closer to a centerline of the fuselage than a corresponding distal tip of the wing.

According to another aspect of the invention, a vertical take-off and landing (VTOL) aircraft is provided and includes a delta-wing shaped fuselage, first and second wings each including a wing portion extending outwardly from a side of the fuselage and a winglet extending outwardly from a distal tip of the wing, nacelles respectively disposed at the respective distal tips of the wing portions and proprotors respectively attached to each of the nacelles with each of the proprotors being rotatable to generate lift in vertical flight and thrust in horizontal flight.

According to additional or alternative embodiments, the fuselage includes a rounded nose portion, widens in a plan-wise dimension toward a trailing edge thereof, flattens in cross-section toward the trailing edge and has a center of lift point at about a 25-35% root chord location.

According to additional or alternative embodiments, the first and second winglets are swept back at about a 30 degree angle.

According to additional or alternative embodiments, each of the proprotors defines a pivotable rotor disk having an interior edge that is closer to a centerline of the fuselage than a corresponding trailing edge corner of the fuselage and an exterior edge that is closer to the centerline of the fuselage than a corresponding distal tip of the wing.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 8 is a top down view illustrating a comparison between lift centers of wing structures with 0 degrees of sweep and 30 degrees of sweep;

FIG. 9 is a top down view illustrating comparisons between nacelle span and proprotor-to-chord characteristics of the VTOL aircraft of FIGS. 1 and 2 versus a VTOL aircraft with a barrel shaped fuselage and 0 degrees of sweep.

The detailed description explains embodiments of the invention, together with advantages and features, by way of example with reference to the drawings.

DETAILED DESCRIPTION OF THE INVENTION

As will be described below, a hybridized rotor blown wing (RBW) aircraft is provided and can fly as a rotorcraft and as a fixed wing aircraft. The aircraft includes a wing, nacelles with prop-rotors and a fuselage. The aircraft structures exhibit high lift/drag (L/D) characteristics and thus offer enhanced distance and loiter mission benefits. The aircraft also has a relatively short distance between its wing structures and its proprotors, among other features, which will tend to mitigate adverse prop-whirl flutter.

Figure 1:
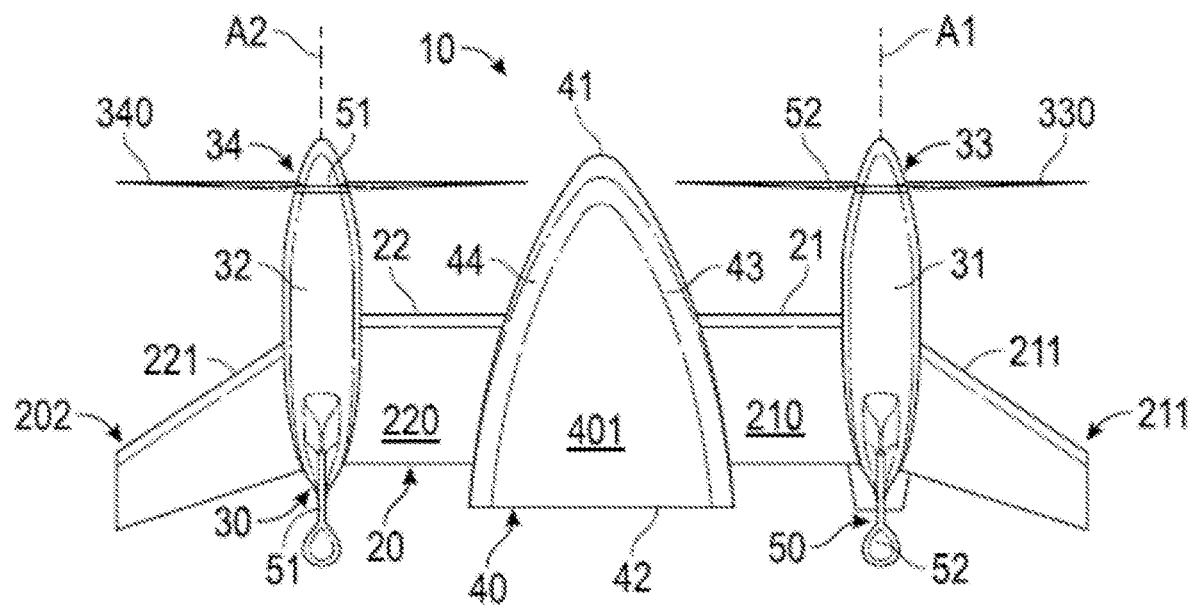
FIG. 1 is an elevational view of a vertical take-off and landing (VTOL) aircraft in a grounded condition in accordance with embodiments.
Figure 2:
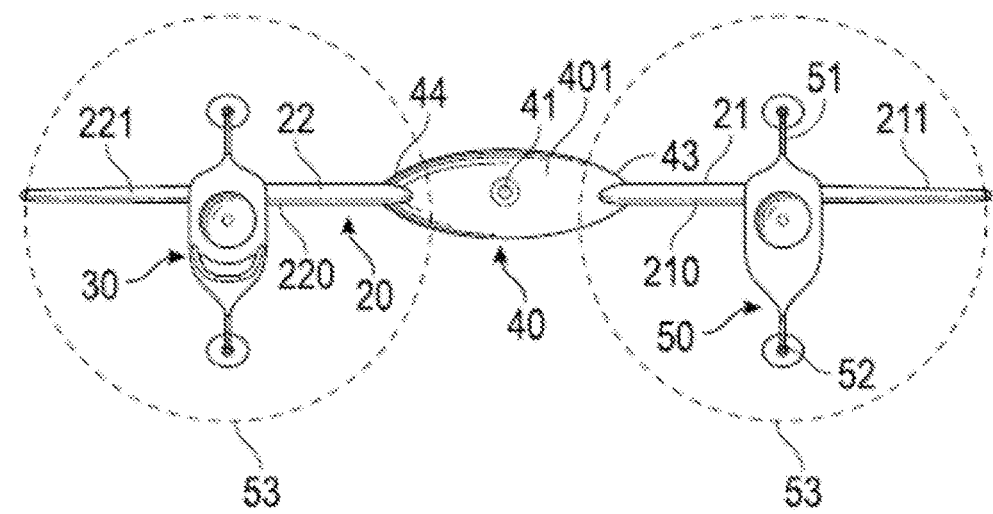
FIG. 2 is a plan view of the VTOL aircraft in the grounded condition.

With reference to FIGS. 1, 2 and 9, a vertical take-off and landing (VTOL) aircraft 10 is provided. The aircraft 10 includes a wing structure 20, nacelles 30, a delta-wing shaped fuselage 40 and alighting elements 50. The fuselage 40 includes a nose portion 41, which may be aerodynamically rounded to reduce drag effects, a trailing edge portion 42, a first side 43 and a second side 44 opposite the first side 43. The wing structure 20 includes a first wing 21 extending outwardly from the first side 43 and a second wing 22 extending outwardly from the second side 44. The alighting elements 50 include spires 51 that extend away from respective planes of the wing structure 20 and alighting features 52, such as landing gear. The alighting features 52 are coupled to distal ends of the spires 51 and, in a grounded condition, the aircraft 10 sits on the alighting features 52 with the nose portion 41 pointing upwardly.

During take-off, hover (or loiter) and landing, the aircraft 10 maintains this vertical orientation but, as flight operations transition to horizontal flight, the nose portion 41 turns over and the wing structure 20 becomes more parallel with the horizon.

The first wing 21 particularly includes a first wing portion 210 extending outwardly from the first side 43 of the fuselage 40 in a first direction and a first winglet 211. The first winglet 211 extends outwardly in the first direction from around a distal tip of the first wing portion 210 at a first end 201 of the wing structure 20. The second wing 22 particularly includes a second wing portion 220 extending outwardly from the second side 44 of the fuselage 40 in a second direction, which is opposite the first direction, and a second winglet 221. The second winglet 221 extends outwardly in the second direction from around a distal tip of the second wing portion 220 at a second end 202 of the wing structure 20.

The nacelles 30 include at least a first nacelle 31 and a second nacelle 32. The first nacelle 31 is disposed at the distal tip of the first wing portion 210 and the second nacelle 32 is disposed at the distal tip of the second wing portion 220. The first nacelle 31 is supportive of a first proprotor 33, which is attached to the first nacelle 31 and has a propeller 330 that is configured to be driven to rotate about rotational axis A1 to generate lift and thrust for the aircraft 10 in vertical flight and to generate thrust for the aircraft 10 in horizontal flight. The second nacelle 32 is supportive of a second proprotor 34, which is attached to the second nacelle 32 and has a propeller 340 that is configured to be driven to rotate about rotational axis A2 to generate lift and thrust for the aircraft 10 in vertical flight and to generate thrust for the aircraft 10 in horizontal flight.

The propellers 330 and 340 each include a hub 51 disposed at a forward end of the corresponding one of the first and second nacelles 31 and 32 and rotor blades 52 extending outwardly from the hub 51. The propellers 330 and 340 are drivable by at least one motive power generating unit, which may be housed in at least one or both of the first nacelle 31 and the second nacelle 32 and/or the fuselage 40, such that the rotor blades 52 rotate about the rotational axes A1 and A2 to define rotor disks 53 (see FIG. 2). The motive power generating unit may be embodied as a gas turbine engine, an internal combustion engine, a rotary engine, an electrical motor-generator or a gas-electric hybrid engine. In cases where the propellers 33 and 340 are remote from their respective motive power generating unit (e.g., the case where the motive power generating unit is a single gas turbine engine housed in only the first nacelle 31), the aircraft 10 may further include a transmission unit with a drive shaft extending from the first nacelle 31 to the second nacelle 32.

In addition to being rotatable about the rotational axes A1 and A2, the propellers 330 and 340 are also pivotable relative to the rotational axes A1 and A2. This pivoting permits navigational and flight control of the aircraft 10 and causes the rotor disks 53 to be pivotable such that each one forms an inner circular segment 530 and an outer circular segment 531 (see FIG. 9). The inner circular segment 530 and the outer circular segment 531 are together centered about the hub 51.

The driving of propeller rotations and pivots may be controlled by a flight computer that is at least partially housed on board the aircraft along with other electronic components and payload elements of the aircraft 10. These features may be housed within at least one or both of the first nacelle 31 and the second nacelle 32 and/or the fuselage 40.

The fuselage 40 has a delta-wing shaped body 401 and is disposed along the wing structure 20 between the nacelles 30 as described above. The delta-wing shaped body 401 may be formed to house components of at least one or more of a motive power generating unit, a flight computer and other aircraft components. In addition, embodiments exist in which the aircraft 10 is configured for manned flight in which case the delta-wing shaped body 401 is formed to define a cabin sized to accommodate a pilot and, in some cases, at least one or more crewmen or passengers. The volume of the delta-wing shaped body 401 is such that sufficient room may be provided for the features noted above while the features are located in or close to a center of gravity location.

Figure 3:
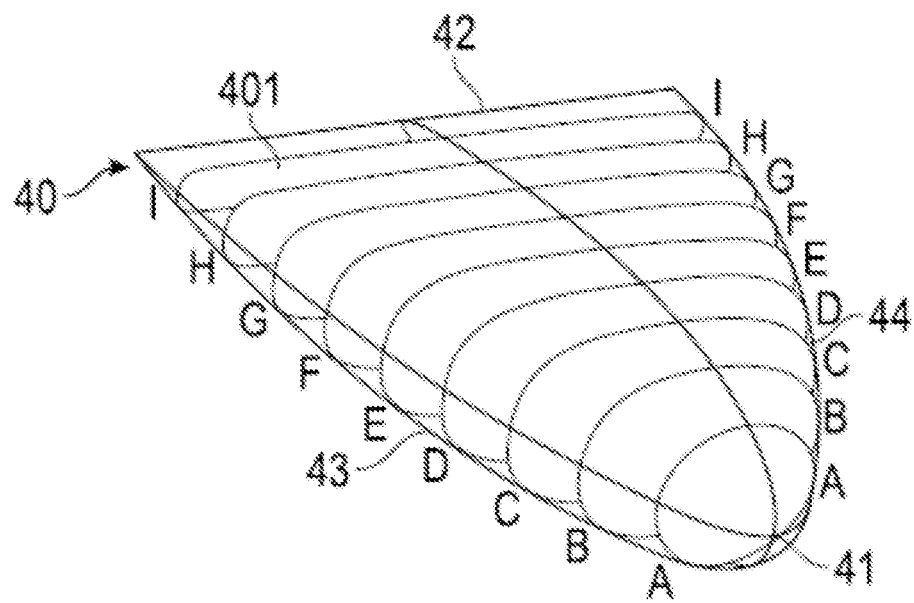
FIG. 3 is a perspective view of sections of a delta-wing shaped fuselage of the VTOL aircraft of FIGS. 1 and 2 in accordance with embodiments.
Figure 4:
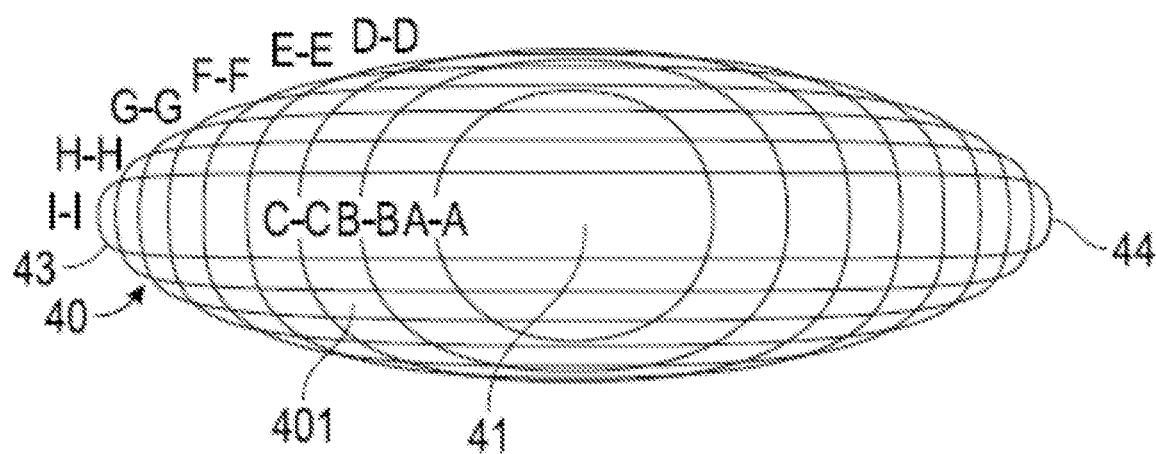
FIG. 4 is an axial view of the sections of FIG. 3.
Figure 5:
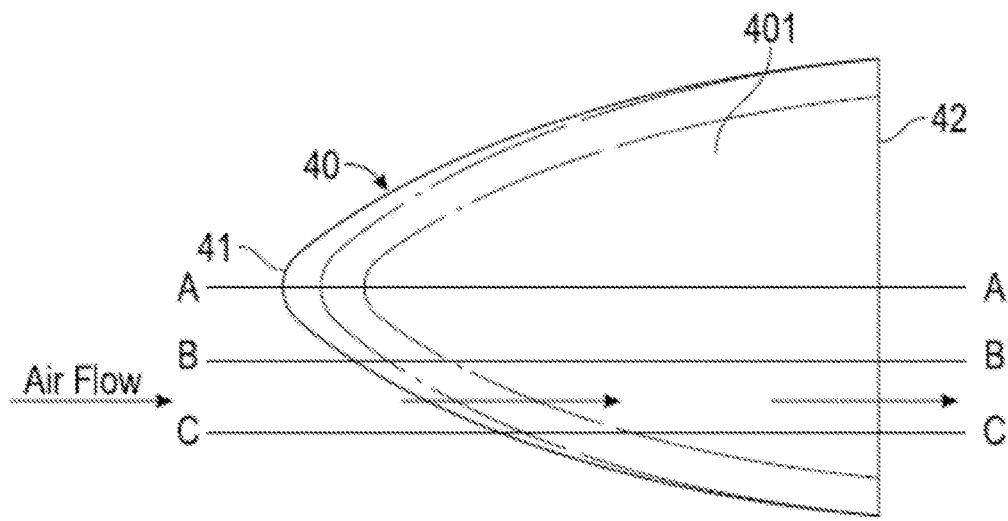
FIG. 5 is a top down view of sections of a delta-wing shaped fuselage interacting aerodynamically with surrounding air.
Figure 6:
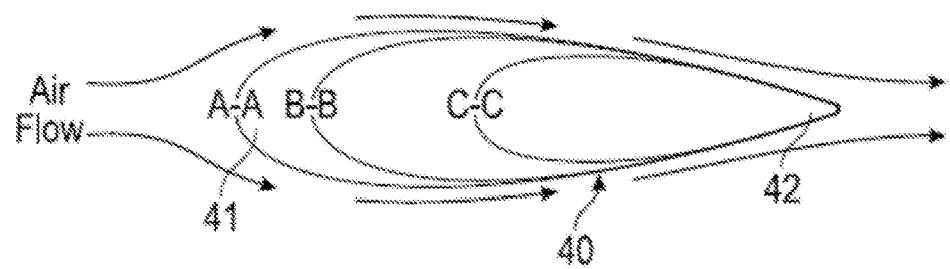
FIG. 6 is a side view of the sections of FIG. 5.

With reference to FIGS. 3 and 4 and to FIGS. 5 and 6, the delta-wing shaped body 401 has the (optionally) rounded nose portion 41 and the trailing edge portion 42 shown in FIGS. 1 and 2 and widens in a plan-wise dimension (i.e., from the first side 43 to the second side 44) from the nose portion 41 toward the trailing edge portion 42. Meanwhile, the delta-wing shaped body 401 flattens in cross-section (see sections A-A to I-I in FIGS. 3 and 4) from the nose portion 41 toward the trailing edge portion 42. With this general configuration, the delta-wing shaped body 401 maintains a lift inducing airfoil shaped profile, as shown at sections A-A, B-B and C-C in FIGS. 5 and 6. That is, the delta-wing shaped body 401 may have a blunt forward end at the nose portion 41 and a gradual tapering toward the trailing edge portion 42.

Figure 7:
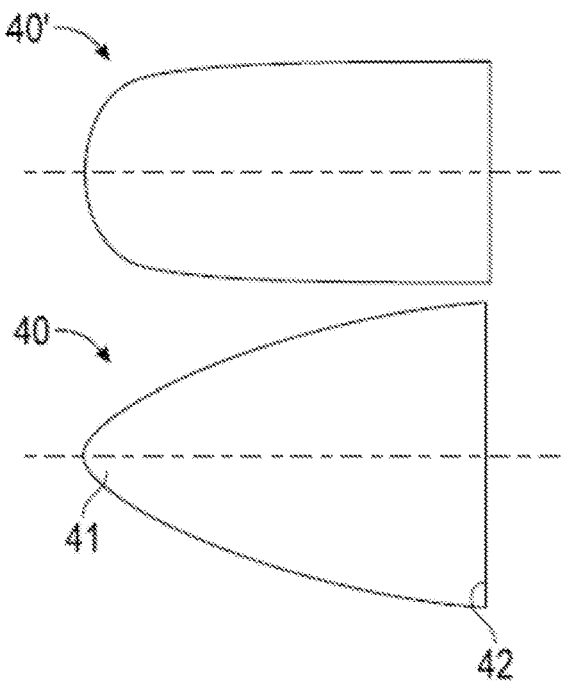
FIG. 7 is a top down view illustrating a comparison between lift centers of a delta-wing shaped fuselage versus a barrel-wing shaped fuselage.

With reference to FIGS. 7, 8 and 9, the aircraft 10 has certain advantages over other designs. For example, as shown in FIG. 7, the fuselage 40 has a center of lift point located at about 25-35% of its root chord (i.e., proximate to the ¼ chord where the chord of the wing structure 20 runs from the leading edges of the wing structure 20 to the trailing edges of the wing structure 20) owing to the above-noted shaped of the delta-wing shaped body 401. As compared to a barrel shaped fuselage 40' of similar volume, which has a center of lift at about 15-20% of its root chord, the fuselage 40 has an aft-ward center of lift to aid in various flight operations and to increase L/D characteristics of the aircraft 10 as a whole. As another example, as shown in FIGS. 1 and 8, the first and second winglets 211 and 221 of the first and second wings 21 and 22, respectively, may be swept back by an angle of about 30 degrees. As compared to a wing structure 20' with no such sweep and thus a center of lift at about 25% of its root chord, the wing structure 20 has a center of lift at about 35-40% of its root chord. This again aids in various flight operations and increases L/D characteristics of the aircraft 10 as a whole.

As noted above, the rotor disks 53 are pivotable such that each one forms the inner circular segment 530 and the outer circular segment 531 that are together centered about the hub 51. In addition, with the first and second winglets 211 and 221 of the first and second wings 21 and 22, respectively, swept back, the rotor disks 53 may be moved relatively close to one another and to the ¼ chord location of the wing structure 20. In particular and, as shown in FIG. 9, the first and second nacelles 31 and 32 may be about 5-15% closer to one another as compared to those of an aircraft 10' with a barrel shaped fuselage and un-swept wings. Meanwhile, the rotor disks 53 may be 10-20% closer to the ¼ chord location of the wing structure 20 as compared to the corresponding features of the aircraft 10'.

The proximity of the first and second nacelles 31 and 32 is permitted by the shape of the delta-wing shaped body 401 given that the nose portion 42 is narrow at the chord-location of the rotor disks 53 at least as compared to the width of the trailing edge portion 42. In fact, the proximity of the first and second nacelles 31 and 32 is such that respective interior edges 532 of the rotor disks 53 are closer to a centerline 402 of the fuselage 40 than corresponding trailing edge corners 420 of the fuselage 40. In addition, the proximity is such that respective exterior edges 533 of the fuselage 40 are closer to the centerline 402 than corresponding distal tips of the first and second winglets 211 and 221.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A vertical take-off and landing (VTOL) aircraft, comprising:
   a wing;
   nacelles supportively disposed at opposite sides of the wing;
   proprotors respectively attached to each of the nacelles with each of the proprotors being rotatable to generate lift in vertical flight and thrust in horizontal flight; and
   a delta-wing shaped fuselage disposed along the wing between the nacelles, wherein a cross-section of the delta-wing shaped fuselage flattens toward a trailing edge.

2. The VTOL aircraft according to claim 1, wherein the fuselage widens in a plan-wise dimension toward the trailing edge.

3. The VTOL aircraft according to claim 1, wherein the fuselage comprises a rounded nose portion.

4. The VTOL aircraft according to claim 1, wherein the fuselage has a center of lift point at a 25-35% root chord location.

5. The VTOL aircraft according to claim 1, wherein the wing comprises:
   a first wing portion extending outwardly from the fuselage in a first direction;
   a first winglet extending outwardly from a distal tip of the first wing portion;
   a second wing portion extending outwardly from the fuselage in a second direction opposite the first direction; and
   a second winglet extending outwardly from a distal tip of the second wing portion.

6. The VTOL aircraft according to claim 5, wherein the nacelles are respectively disposed at the respective distal tips of the first and second wing portions.

7. The VTOL aircraft according to claim 5, wherein the first and second winglets are swept back.

8. The VTOL aircraft according to claim 7, wherein the first and second winglets are swept back at a 30 degree angle.

9. The VTOL aircraft according to claim 1, wherein each of the proprotors defines a pivotable rotor disk.

10. The VTOL aircraft according to claim 1, wherein each of the proprotors defines a rotor disk having an interior edge that is closer to a centerline of the fuselage than a corresponding trailing edge corner of the fuselage.

11. The VTOL aircraft according to claim 1, wherein each of the proprotors defines a rotor disk having an exterior edge that is closer to a centerline of the fuselage than a corresponding distal tip of the wing.

12. A vertical take-off and landing (VTOL) aircraft, comprising:
   a delta-wing shaped fuselage, wherein a cross-section of the delta-wing shaped fuselage flattens toward a trailing edge;
   first and second wings each including a wing portion extending outwardly from a side of the fuselage and a winglet extending outwardly from a distal tip of the wing portion;
   nacelles respectively disposed at the respective distal tips of the wing portions; and proprotors respectively attached to each of the nacelles with each of the proprotors being rotatable to generate lift in vertical flight and thrust in horizontal flight.

13. The VTOL aircraft according to claim 12, wherein the fuselage comprises a rounded nose portion, widens in a plan-wise dimension toward a trailing edge thereof, flattens in cross-section toward the trailing edge and has a center of lift point at a 25-35% root chord location.

14. The VTOL aircraft according to claim 12, wherein the first and second winglets are swept back at a 30 degree angle.

15. The VTOL aircraft according to claim 12, wherein each of the proprotors defines a pivotable rotor disk having an interior edge that is closer to a centerline of the fuselage than a corresponding trailing edge corner of the fuselage and an exterior edge that is closer to the centerline of the fuselage than a corresponding distal tip of the wing.

* * * * *

UNITED STATES PATENT AND TRADEMARK OFFICE
CERTIFICATE OF CORRECTION

PATENT NO. : 10,538,322 B2
APPLICATION NO. : 15/533505
DATED : January 21, 2020
INVENTOR(S) : Mark R. Alber, Charles Gayagoy and Timothy F. Lauder It is certified that error appears in the above-identified patent and that said Letters Patent is hereby corrected as shown below:

On the Title Page

At item (72) Inventors please add:
"Timothy F. Lauder, Oxford, CT (US)"

Signed and Sealed this
Nineteenth Day of July, 2022

Katherine Kelly Vidal
*Director of the United States Patent and Trademark Office*